United States Patent
O'Neill et al.

(10) Patent No.: US 10,148,799 B2
(45) Date of Patent: Dec. 4, 2018

(54) AUXILIARY OPTICAL SYSTEM FOR USE WITH MOBILE ELECTRONIC DEVICE IN PROTECTIVE CASE

(71) Applicant: Portero Holdings, LLC, Lake Forest, CA (US)

(72) Inventors: Patrick D. O'Neill, Huntington Beach, CA (US); Chong Pak, Lakewood, CA (US); Jason Patrick, Long Beach, CA (US); Joshua Cantor, Huntington Beach, CA (US); Ryan Nguyen, Fountain Valley, CA (US); Daniel Arato, Los Angeles, CA (US)

(73) Assignee: Portero Holdings, LLC, Lake Forest, CA (US)

( * ) Notice: Subject to any disclaimer, the term of this patent is extended or adjusted under 35 U.S.C. 154(b) by 0 days.

(21) Appl. No.: 15/351,192

(22) Filed: Nov. 14, 2016

(65) Prior Publication Data
US 2017/0142242 A1 May 18, 2017

Related U.S. Application Data

(60) Provisional application No. 62/337,822, filed on May 17, 2016, provisional application No. 62/254,637, filed on Nov. 12, 2015.

(51) Int. Cl.
| | |
|---|---|
| *H04B 1/38* | (2015.01) |
| *H04M 1/02* | (2006.01) |
| *H04B 1/3888* | (2015.01) |
| *H04M 1/18* | (2006.01) |

(52) U.S. Cl.
CPC ........ *H04M 1/0264* (2013.01); *H04B 1/3888* (2013.01); *H04M 1/0254* (2013.01); *H04M 1/185* (2013.01)

(58) Field of Classification Search
CPC .. H04M 1/0264; H04M 1/0254; H04M 1/185; H04B 1/3888; H04N 5/2254; H04N 5/2257; H04N 5/23209
See application file for complete search history.

(56) References Cited

U.S. PATENT DOCUMENTS

| | | |
|---|---|---|
| 8,279,544 B1 | 10/2012 | ONeill |
| 8,639,106 B1 | 1/2014 | Gleason et al. |
| 2013/0002939 A1* | 1/2013 | O'Neill .................... G02B 7/14 348/360 |
| 2013/0127309 A1* | 5/2013 | Wyner ................. H05K 5/0217 312/223.1 |
| 2014/0119718 A1* | 5/2014 | Oh ....................... G03B 11/041 396/448 |

FOREIGN PATENT DOCUMENTS

KR    101149925 B1    5/2012

* cited by examiner

*Primary Examiner* — Tuan Pham
(74) *Attorney, Agent, or Firm* — Dorsey & Whitney LLP

(57) ABSTRACT

An auxiliary optical system can be configured to be removably attachable to a mobile electronic device within a protective case. The auxiliary optical system can be shaped and sized to fit onto and/or into a region of a protective case such that the auxiliary optical device is in optical communication with one or more onboard cameras on the front and/or rear surface of the mobile electronic device and such that the auxiliary optical system resists sliding, tilting, or otherwise moving with respect to the mobile electronic device and/or the protective case.

18 Claims, 14 Drawing Sheets

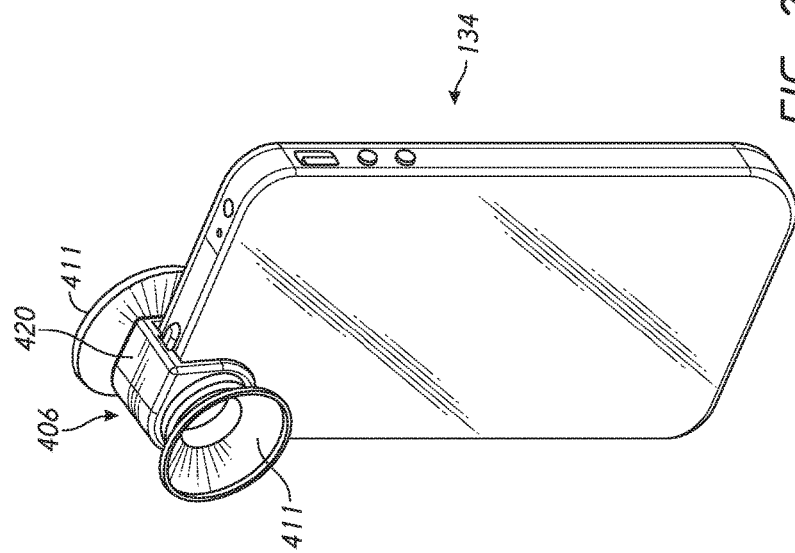
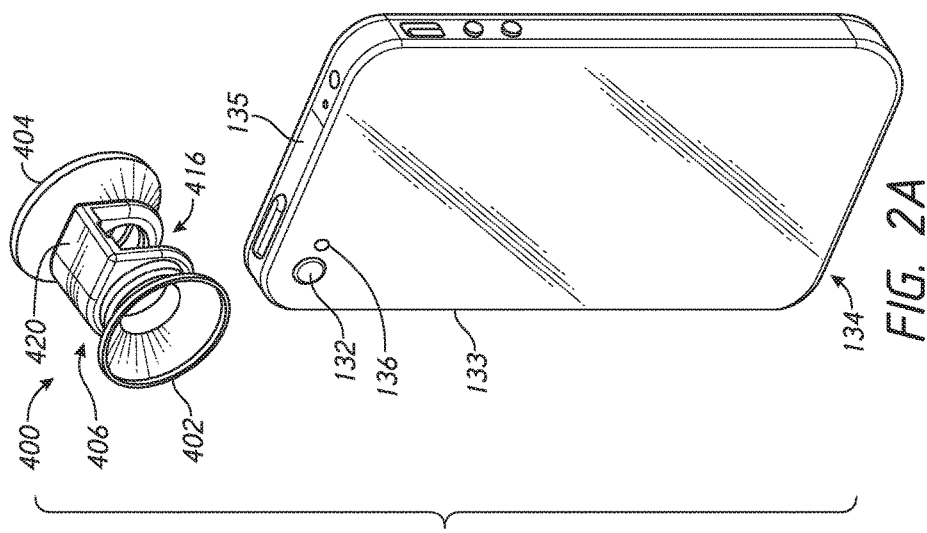

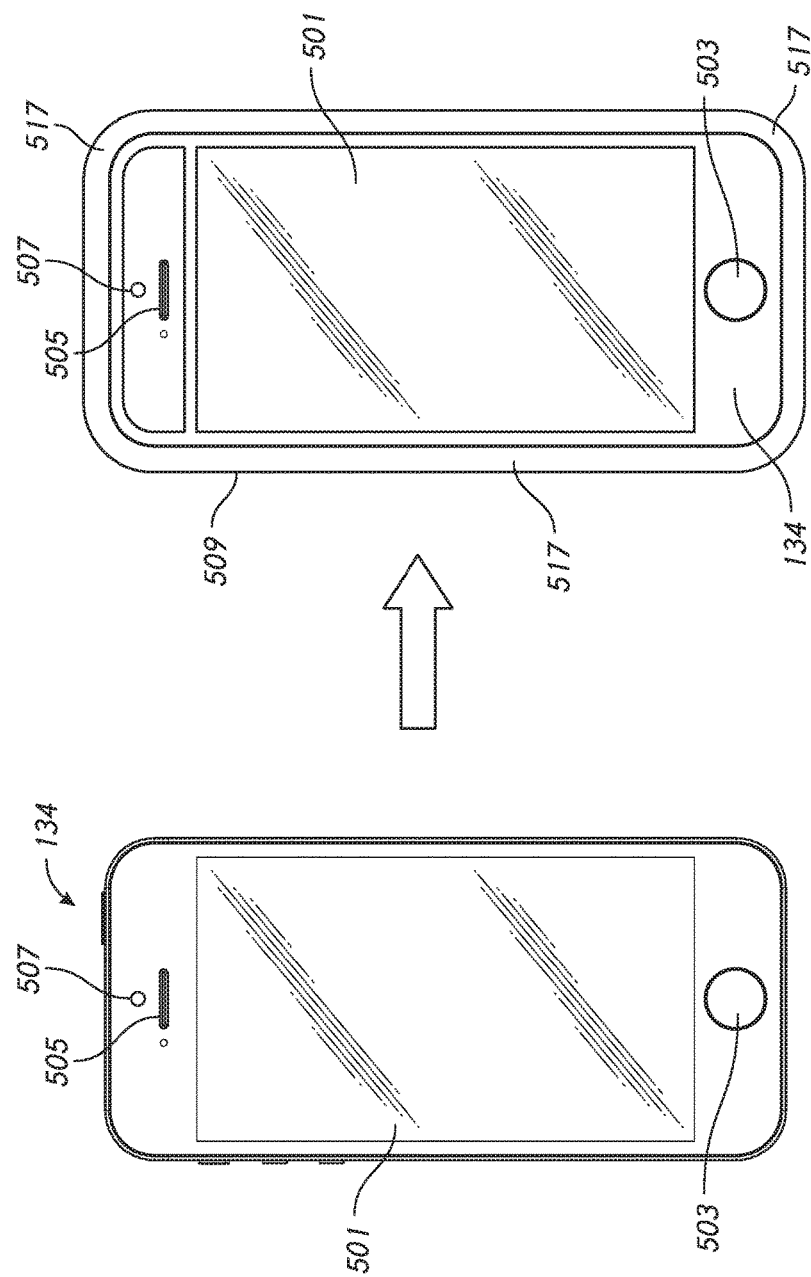

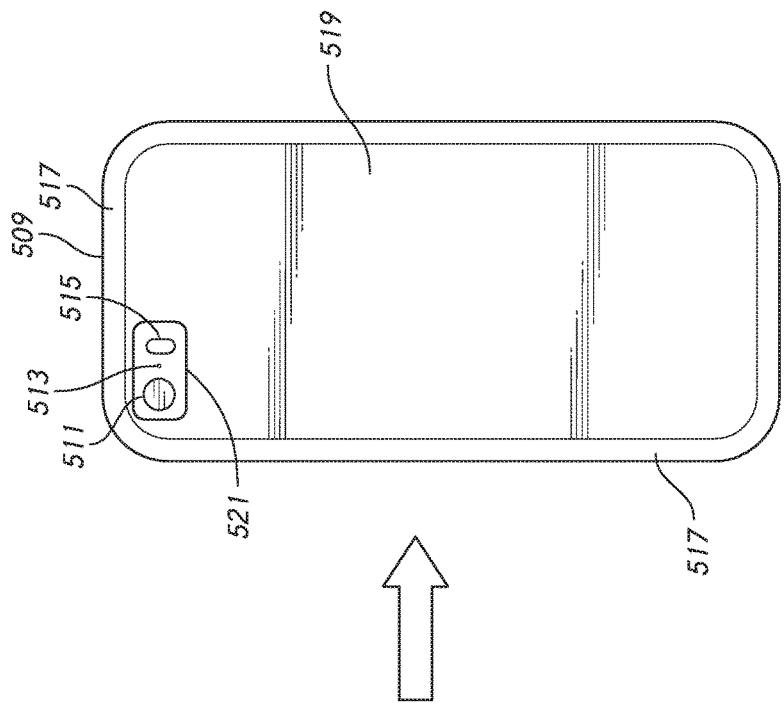
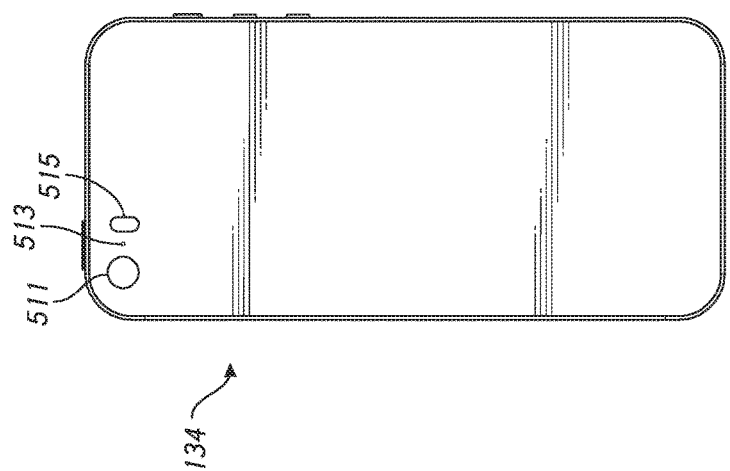

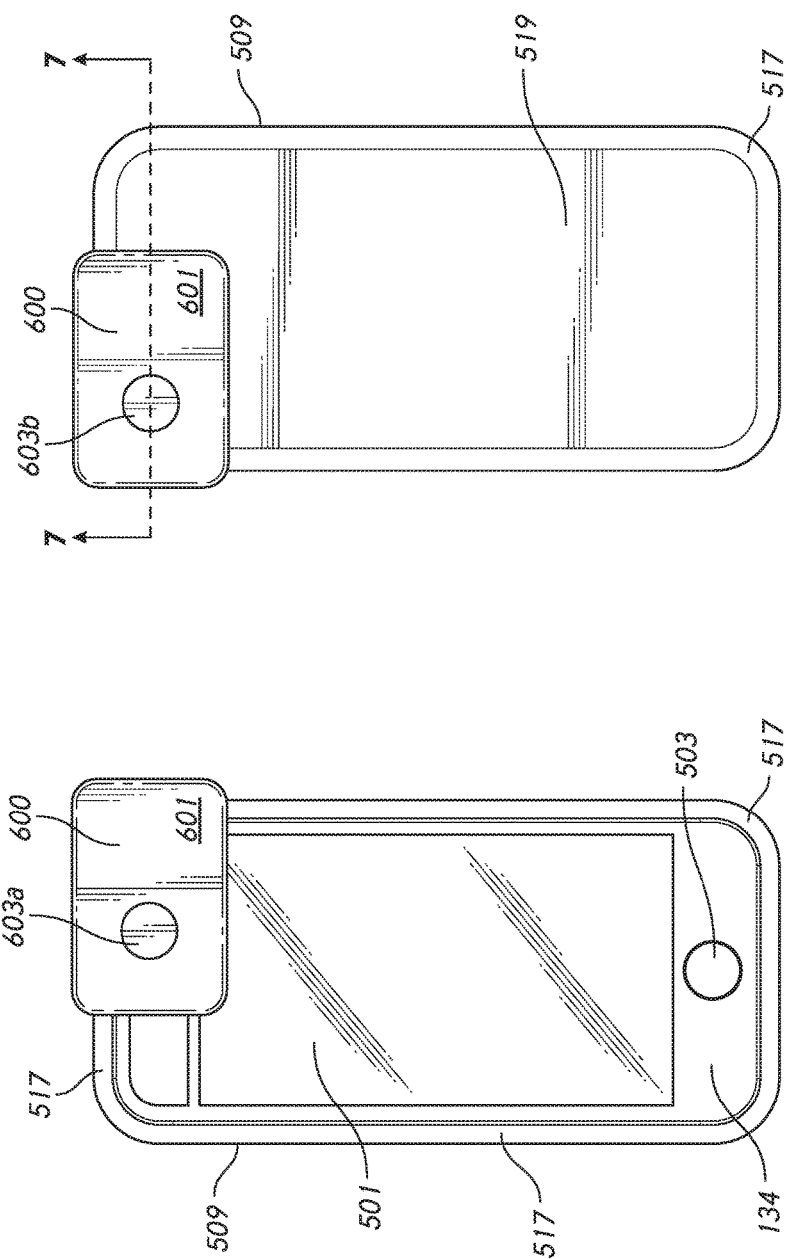

AUXILIARY OPTICAL SYSTEM FOR USE WITH MOBILE ELECTRONIC DEVICE IN PROTECTIVE CASE

CROSS-REFERENCE TO RELATED APPLICATIONS

This application claims the benefit of U.S. Provisional Application No. 62/254,637, filed Nov. 12, 2015, and U.S. Provisional Patent Application No. 62/337,822, filed May 17, 2016, both of which are hereby incorporated by reference in their entireties.

BACKGROUND OF THE INVENTIONS

Field of the Inventions

The inventions relate generally to accessories for communication devices (e.g., mobile telephones, mobile texting devices, electronic pad devices, laptop computers, desktop computers, gaming devices, and/or devices capable of linking electronically to another device or to a network such as the Internet, etc.), and specifically to removable functional components for communication devices.

Description of the Related Art

In recent years, many advances in computer networking and processing technology have made it possible for mobile devices to comprise cameras that permit users to capture images. In many cases, these images can be stored, processed, and transmitted. However, there are many design constraints on onboard cameras in mobile devices that can limit the weight, size, expense, shape, adjustability, flexibility, versatility, feature choices, and overall quality of the lensing systems of such cameras. Consequently, many cameras and mobile devices are inadequate for a wide variety of photographic needs and may produce lower quality photographic images, fewer image options, incompatibilities in attachment structures, weight, optics, size, transportation, storage, ergonomics, and/or portability.

In addition, the mobile nature of such devices makes them especially vulnerable to damage by inadvertent contact with other objects during transportation or storage, such as when a mobile electronic device is dropped on the ground or comes into contact with water or another potentially damaging substance. Existing cases for mobile electronic devices can help in some instances to shield or protect mobile electronic devices from certain types of damage. However, such cases do not provide sufficient accommodations for the use of auxiliary performance-enhancing products with the mobile devices while the cases are installed on the mobile devices.

SUMMARY

An auxiliary optical system can be configured to be removably attachable to a mobile electronic device within a protective case. The auxiliary optical system can be shaped and sized to fit onto and/or into a region of a protective case such that the auxiliary optical system is in optical communication with one or more onboard cameras on the front and/or rear surface of the mobile electronic device and such that the auxiliary optical system resists sliding, tilting, or otherwise moving with respect to the mobile electronic device and/or the protective case.

BRIEF DESCRIPTION OF THE DRAWINGS

Certain embodiments of the inventions will now be discussed in detail with reference to the following figures. These figures are provided for illustrative purposes only, and the inventions are not limited to the subject matter illustrated in the figures.

FIGS. 2A and 2B illustrate an example of the auxiliary lens system of FIGS. 1A-1E positioned for attachment on a mobile electronic device, and then attached to the mobile electronic device.

FIG. 4A illustrates a front plan view of an example of a mobile electronic device.

FIG. 4B illustrates a front plan view of an example of a mobile electronic device positioned within a protective case.

FIG. 5A illustrates a rear plan view of the mobile electronic device of FIG. 4A.

FIG. 5B illustrates a rear plan view of the combination of the mobile electronic device and protective case of FIG. 4B.

FIG. 6A illustrates a front plan view of the combination of the mobile electronic device and protective case of FIG. 4B coupled to an auxiliary optical system.

FIG. 6B illustrates a rear plan view of the combination of the mobile electronic device and protective case of FIG. 4B coupled to the auxiliary optical system.

Figure 1A:
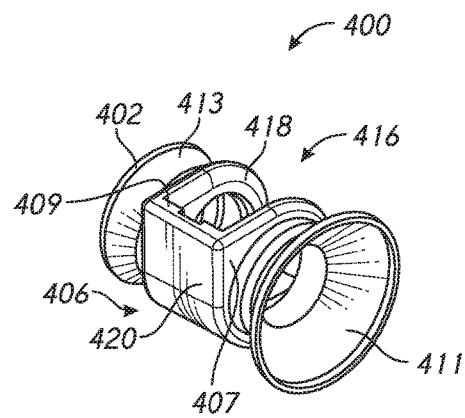
FIGS. 1A, 1B, 1C, 1D, and 1E illustrate an example of several views of an auxiliary lens system with a plurality of lenses used for different purposes.
Figure 1B:
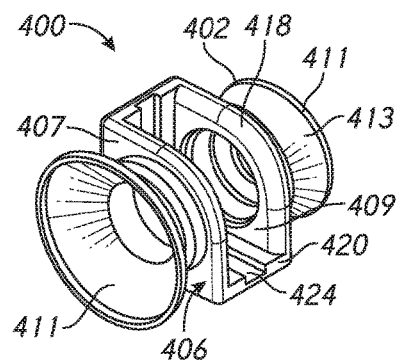

Many other types of communication devices besides those illustrated and described herein can be used, and many different types of components or parts can be used in the auxiliary lens systems, which are encompassed by this specification. The proportions, orientations, shapes, and relative sizes of components illustrated in the drawings form part of this disclosure, but should not be limiting to any claim unless explicitly recited in such claim.

DETAILED DESCRIPTION OF EMBODIMENTS

The following detailed description is now directed to certain specific examples of embodiments of the disclosure.

In this description, reference is made to the drawings wherein like parts are designated with like numerals throughout the description and the drawings. The inventions are not limited to examples expressly limited or described in this specification. Various examples of auxiliary optical systems (also referred to as auxiliary optical devices, auxiliary lensing systems, or auxiliary lens systems) and protective cases (also referred to simply as cases) are illustrated in the drawings and/or described in the text of this specification. The selected aggregation of particular features in the descriptions or illustrations is merely for convenience in providing examples in a context, but is not intended to be limiting. Any structure, material, function, method, or step illustrated or described in connection with any embodiment in the specification can be used instead of or in combination with any other structure, material, function, method, or step illustrated or described in connection with any other embodiment in the specification. For example, without limitation, any embodiment in this specification can include multiple lenses attachable to a single retainer, as illustrated in FIGS. 1A-3B, even if not illustrated or described, and/or any embodiment in this specification can be configured to be attached to a mobile electronic device in a first orientation, detached from the communication device, rotated about a generally vertical axis, and reattached to the communication device in a second orientation. No feature, structure, step, material, or component disclosed and/or illustrated in this specification is essential or indispensable.

The term "lens" in this specification is used in its ordinary sense, and includes powered lenses (e.g., lenses that focus, magnify, enlarge, or otherwise alter the direction of light passing through the lens), plano lenses (e.g., lenses that are generally planar, lenses that do not taper in thickness, and/or lenses that are not powered), simple lenses, compound lenses, generally spherical lenses, generally toroidal lenses, generally cylindrical lenses, etc. Any imaging device described or illustrated in this specification can include a retainer attached to one or more lenses or optical regions with one or more different features, including but not limited to a constant or variable magnifying lens, a wide-angle lens, a fish-eye lens, a telescopic lens, a macro lens, a constant or variable polarizing lens, an anti-reflection lens, a contrast-enhancing lens, a light-attenuating lens, a colored lens, or any combination of the foregoing, etc.

The terms "mobile electronic device" and "mobile device" in this specification are used in their ordinary sense, and include mobile telephones, mobile texting devices, media players, electronic tablet devices, laptop computers, gaming devices, wearable electronic devices (e.g., "smart watches" or "smart eyewear"), and/or mobile electronic communication devices capable of linking electronically to another device or to a network such as the Internet, etc. Some mobile electronic devices include one or more onboard cameras that can be used for various imaging purposes, such as photography and videography. In addition, some mobile electronic devices include one or more illumination components, such as one or more lights, and/or flashes, etc., that can be used for photography, videography, and/or other purposes (e.g., as a flash light).

The terms "protective case" and "case" in this specification are used in their ordinary sense, and include structures and products that are removably attachable by users to mobile devices in order to provide protection to the mobile devices onto which they are attached, etc. For example, in some embodiments, any of the cases disclosed herein can provide resistance to damage from impact or shock and/or from ingress of performance-impairing substances, such as moisture from water or other liquids. A user may removably attach a protective case to a mobile device housing to provide protection to the mobile device in addition to the protection provided by the housing of the mobile device. The removably attachable protective case may also provide protection for the housing itself.

Some auxiliary lensing systems described herein can be removably attached to protective cases that have been installed on mobile electronic devices. When attached to protective cases (and/or directly to the mobile devices), the auxiliary lensing systems can selectively enhance or otherwise change an image created from light that is transmitted through an onboard camera lens of the mobile electronic devices. For example, U.S. Pat. No. 8,279,544, titled "Selectively Attachable and Removable Lenses for Mobile Devices," which issued on Oct. 2, 2012, the contents of which are hereby incorporated by reference for all that it discloses, describes various mounting structures and features for removably attachable auxiliary lensing systems. As another example, U.S. patent application Ser. No. 14/743,594, titled "Auxiliary Optical Components for Mobile Devices," which was filed on Jun. 18, 2015, the contents of which are hereby incorporated by reference for all that it discloses, describes additional mounting structures and features for removably attachable auxiliary lensing systems. In some embodiments, including those disclosed in the '544 patent and the '594 application, a removably attachable auxiliary lensing systems may be secured to a mobile electronic device by a clip that contacts generally opposing sides of the electronic device. The lens components may comprise one or more lenses (e.g. one side may have a fisheye lens, while the generally opposing side may have of wide-angle, micro, telephoto, or some other photographic lens). In some embodiments, a removably attachable auxiliary lensing system may be secured to a mobile electronic device without a clip or using one or more structures in addition to a clip.

In some embodiments, a removably attachable auxiliary lensing system provides an auxiliary lens for each of the user- and outward-facing cameras (e.g., a first auxiliary lens is optically aligned with a user-facing camera, and a second auxiliary lens is optically aligned with an outward-facing camera) either simultaneously or otherwise without requiring the removably attachable auxiliary lensing system to be removed, rotated, and re-attached. In some such embodiments, the removably attachable auxiliary lensing system may optionally be reversed by a user (e.g., removed, rotated, and re-attached) between a first position and a second position such that the lens used with the outward-facing camera can be used with (e.g., optically communicate with or be in optical alignment with) the user-facing camera and vice-versa.

Referring to FIGS. 1A-1E, 2A-2B, and 3A-3B (collectively "FIGS. 1A-3B"), an example of a removably attachable auxiliary optical device 400 is illustrated in many different views. In some embodiments, as illustrated, an auxiliary optical device 400 can generally comprise a retainer portion 406 and one or a plurality of lens portions 402, 404. The retainer portion 406 is generally configured to be removably attachable to a mobile electronic communication device such that the one or more optical portions, such as lens portions 402, 404, can be positioned in a region generally covering or near an onboard camera lens in the communication device to enable the one or more lens portions 402, 404 to cooperate optically with the onboard camera, to provide different optical enhancements, improvements, modifications, and/or alternatives, such as one or more of the following: magnification, telephoto, wide angle, fish-eye, polarization, glare reduction, anti-reflection, light filtering or attenuation at particular ranges of wavelengths, and/or coloring, etc. As with all features, structures, steps, materials, or components disclosed and/or illustrated in this specification, any of the foregoing optical features or combinations thereof can be included in any device in this specification. Any of the lenses can be of any suitable shape or configuration, such as plano, spherical, parabolic, cylindrical, toroidal, and/or simple or compound, etc. In some embodiments, as illustrated, the retainer portion 406 is shaped so as to attach to the communication device in a region and in a manner that permits a user to see all or virtually all of a viewing portion (not shown) of the communication device without obstruction or without appreciable obstruction.

One or more of the lens portions 402, 404 can be removably attached to the retainer portion 406 with a securing structure, such as a screw thread, a bayonet mount, a friction fit, a snap fit, a clip, and/or a clasp, etc. One or more of the lens portions 402, 404 can be interchangeable or replaceable with one or more other lens portions with one or more different optical features, such as any of the optical features described elsewhere in this specification.

In some embodiments, the retainer portion 406 can comprise a channel 416 with a plurality of sidewalls or side retaining structures 407, 409. In some embodiments, the retainer portion 406 comprises only a single sidewall or side retaining structure, or no sidewall or side retaining structure. The width of the channel 416, e.g., the distance between the respective sidewalls or side retaining portions 407, 409, can be configured to be generally complimentary to the thickness of a portion of the communication device(s) 134 on which the retainer portion 406 is configured to attach. In some embodiments, the natural width of the channel 416 (e.g., before attachment to a communication device) is approximately the same size or slightly smaller than the thickness of a corner, such as an upper corner, of the outside housing of a communication device near the light aperture of the onboard camera of the communication device. In some embodiments, the natural width of the channel 416 is approximately the same size or slightly smaller than the thickness of another portion of the outside housing, such as an upper central region, or another location.

In some embodiments, as illustrated, one or more of the plurality of walls 407, 409 can have a curvilinear shape along one or more edges to permit the retainer portion 406 to provide increased distance of contact along the edge of the communication device while diminishing the area across a transverse surface of the device that is obstructed by the retainer portion 406. For example, in some embodiments, as illustrated, the curvilinear shape along one or more edges of the walls 407, 409 permits the retainer portion 406 to extend along and attach to at least a portion of two generally converging or generally perpendicular outer edges or sides of a communication device that is approximately as wide as either of the lens portions 402, 404, while diminishing the amount of space on the front of the electronic communication device that is blocked. In the example shown in FIGS. 1A-3B, the curvilinear shape of the edge of the walls 407, 409 can comprise a rounded corner, and avoid or omit a lower pointed or sharp corner that may otherwise extend into and obstruct the viewing portion of the communication device. In some embodiments, the auxiliary optical device 400 does not appreciably block or obstruct the viewing surface of the mobile electronic communication device when attached.

All or part of the retainer portion 406, such as one or more of the plurality of walls 407, 409, can be made of a material (e.g., a polymer or a silicone) that is sufficiently flexible to permit some degree of deformation (e.g., compression, bending, or stretching) of one or more walls 407, 409, so that the channel 416 can be temporarily widened while sliding the auxiliary optical device 400 onto a communication device 134, but at least a portion of one or more of the walls 407, 409 can be sufficiently stiff, rigid, or resilient to urge one or more of the plurality of walls 407, 409 to return to its original position and thereby exert a gripping force against a portion of the communication device, thereby providing a friction fit between the retainer portion 406 and the communication device 134. In some embodiments, a portion (or all) of the material of the retainer portion 406, especially the region on the inner side of the walls 407, 409 within the channel 416, can also be tacky or somewhat slide resistant to enhance the gripping of the retainer portion 406 to the communication device 134. In some embodiments, the gripping force and/or slide resistance can reduce or eliminate the need to attach a permanent or temporary mounting component to the communication device. For example, the lens component 400 can be repeatedly attached to and removed from a communication device 134 without requiring (though not prohibiting) installation on the communication device of a separate permanently or semi-permanently attached mounting component such as a bracket, magnet, adhesive, or other fastening component, thereby providing ease of installation while preserving the original overall shape, appearance, functionality, compatibility (e.g., with other communication devices or cases), and/or feel of the communication device when the lens component is removed.

As with any features, structures, steps, materials, or components disclosed and/or illustrated in this specification, any auxiliary optical device in this specification can be utilized with any type of mobile electronic communication device, including any of those illustrated and/or described in this specification. The mobile electronic communication device 134, as illustrated in FIGS. 2A, 2B, 3A, and 3B, includes at least one onboard camera 132 with a lens that is positioned in a flush or virtually flush relationship with the face of the mobile electronic communication device 134 in which it is embedded, and an onboard flash 136. In some embodiments, the onboard camera 132 or one or more components of the onboard camera 132, such as a lens and/or a protective metal ring can protrude or extend above or beyond the face of the mobile electronic communication 134.

Figure 1C:
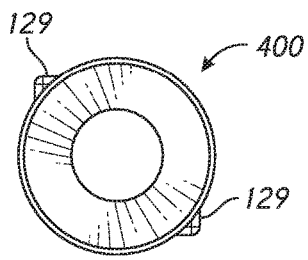
Figure 1D:
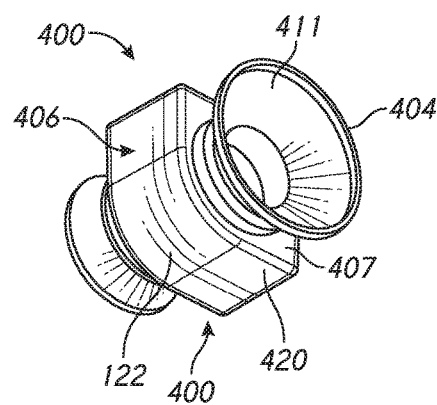
Figure 1E:
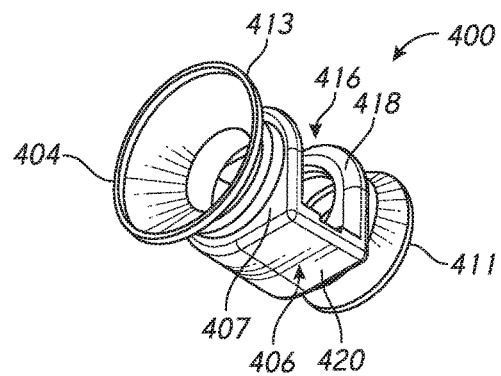

In some embodiments, the retainer portion 406 can comprise an upper wall 420 that can be shaped in some embodiments to generally correspond to the shape of one or more edges (e.g., side and/or top edges) of a communication device 134. As illustrated, the upper wall 420 has a generally curvilinear shape with a rounded corner 122. The retainer portion 406 can also include one or more internal surface features (e.g., recesses, protrusions, and/or contours, etc.) that are configured to generally avoid interference with one or more external features on a communication device 134. For example, as illustrated, a channel 424 can include a groove to avoid interference or inadvertent contact with a button or other feature on a communication device when the auxiliary optical device 400 is attached to the communication device 134. As illustrated in FIG. 1C, the sidewalls 407, 409 of the retainer 406 can comprise one or more generally pointed or angular regions 129.

In some embodiments, as illustrated, the retainer portion 406 can be configured to grip at least two nonparallel sides of a communication device 134. For example, the retainer portion 406 can contact at least a first generally vertical side or edge surface 133 of a communication device and at least a second generally horizontal and generally orthogonal side or edge surface 138 of a mobile electronic device 134 (e.g., the lateral side and the top side of the mobile electronic device) at the same time during use. In some embodiments, this contact by multiple generally perpendicular edges or surfaces permits repeatable adequately precise placement of the retainer portion 406. In some embodiments, only one edge is contacted or no edges are contacted. In some embodiments, the retainer portion, in any of a variety of configurations, can be attached to a mobile electronic communication device in a single attachment motion, without requiring user adjustment of the location or structure of the retainer portion and/or optical portion during attachment.

In some embodiments, two or more contacting surfaces in the retainer portion 406 can converge at an upper corner having a rounded external surface. In some embodiments, as illustrated, the retainer portion 406 is substantially smaller than the communication device to which it is configured to attach, or even substantially smaller than the viewing portion of the communication device to which it is configured to attach. In some embodiments, a retainer portion can be configured to contact only one side or edge (e.g., the generally vertical or the generally horizontal side or edge), such as by contacting both the front and rear surface of such side of edge but without also requiring contact with another side or edge. An example of such an embodiment can generally be formed from a retainer portion with a general U-shape comprising an upper wall, two side walls, and an opening on each side of the side walls. In some embodiments, a retainer portion can be configured to contact only one surface of the mobile electronic communication device, such as the surface of the mobile electronic communication device on which the onboard camera is located.

In some embodiments, the retainer portion 406 can permit the auxiliary optical device 400 to be removably attached to a communication device without requiring non-stock mounts on the communication device and without requiring dynamic mounts on the retainer portion 112 itself (e.g. fasteners, screws, adjustable clamps, etc.). For example, in some embodiments, a user can attach the auxiliary optical device 400 to a corner or some other location on a communication device by simply sliding it, for example, onto the corner or other location of the communication device, and can remove it by simply pulling it off, without requiring user adjustment during attachment. In some embodiments, as illustrated, the auxiliary optical device 400 can remain on the communication device 134 by way of a friction fit. The attachment to the communication device can avoid a residue deposit from adhesive, scratches to the exterior surface, or other damage or alteration of the communication device. In some embodiments, the retainer portion can be sufficiently wide and/or long so that it is adapted to receive an end and/or side region (e.g., two or more corners) of a communication device rather than merely one corner, and the other aspects of other embodiments disclosed herein can apply to such embodiments, including but not limited to the shape and materials of construction and the accomplishment of a friction fit between the retainer portion and the end and/or side region of a communication device. In some embodiments, the retainer portion can utilize dynamic mounts and/or any other means for attachment to a mobile electronic communication device. No means of attachment between an auxiliary lens system and a mobile electronic communication device should be deemed to be essential or indispensable to, or excluded by, this specification or any products herein.

The one or more lens portions 402, 404 generally comprises a transparent optical portion or lens 411, which is typically made of a glass or a polymer, and a securing structure 413. The term "lens" and similar terms should be understood in accordance with the customary meaning in this field, and includes at least any optical portion that permits light to pass through and provides some optical characteristic or protection, such as changing light direction, filtering light, and/or modifying one or more qualities of light that passes through the optical portion, etc. The securing structure 413 can be made of many different types of materials or combinations of materials, such as one or more metals (e.g., aluminum or steel) or one or more plastics. The securing structure 413 can include a generally wide-area opening for receiving the optical portion or lens 411 and a generally narrow-area region for attachment to the retainer portion 406. In some embodiments, the securing structure 413 and the retainer portion 406 can be configured to slide or otherwise move with respect to each other in a limited manner to allow for adjustment of the position of the optical portion or lens 402, 404 with respect to the onboard camera lens of a communication device (e.g., for the purpose of addressing manufacturing tolerances in the location of the onboard camera lenses in some communication devices). As illustrated, the mechanism or structure for attachment or securement of the optical portion or lens portion 411 to the retainer portion 406 can be separate from and/or can operate independently of the mechanism or structure for attachment or securement of the retainer portion 406 to the communication device. In some embodiments, as illustrated, the outside surface of the securing structure 413 can taper inwardly from the lens-receiving region to the retainer-attaching region to diminish the amount of material used in manufacturing and to diminish the size and weight of the auxiliary optical device 400. In some embodiments, the auxiliary optical device 400 can be very small, such as less than or equal to about 2½ inches or less than or equal to about 1½ inches across.

In some embodiments, as illustrated in FIGS. 1A-1E, the channel 416 includes an attachment-facilitating surface 418. In the illustrated examples, the attachment-facilitating surface 418 comprises an inwardly curved (e.g., sloped or slanted) surface positioned along the outer edge or slotted opening of the channel 416. In some embodiments, the attachment-facilitating surface 418 can be positioned at or near an outer edge of the channel 416. As illustrated, the attachment-facilitating surface can be thinner near the edge and can gradually become thicker as it progresses further into the channel 416.

As the lens component 400 is moved into an attachment position on a communication device, the attachment-facilitating surface 418 can provide an initial contact region or opening near the outer edge that is effectively wider to facilitate proper orientation and attachment of the device by a user, and a narrower second region further within the channel 416 (or further from the edge of the lens component 400), thereby providing a more secure attachment surface as the auxiliary optical device 400 is moved further onto the attachment region of the communication device 134. In some embodiments, as illustrated, the width of the channel 416 can change between the initial contact region and the second region in a smooth, gradual, and/or curvilinear manner. Some embodiments can include many other types of shapes. For example, the attachment-facilitating surface 418 can include a discontinuous surface or a series of discrete ramps, protrusions, or grooves. As with any other features, structures, steps, methods, or components illustrated and/or described in this specification, the attachment-facilitating surface 418 can be included on any embodiment of an auxiliary optical device.

Figure 3B:
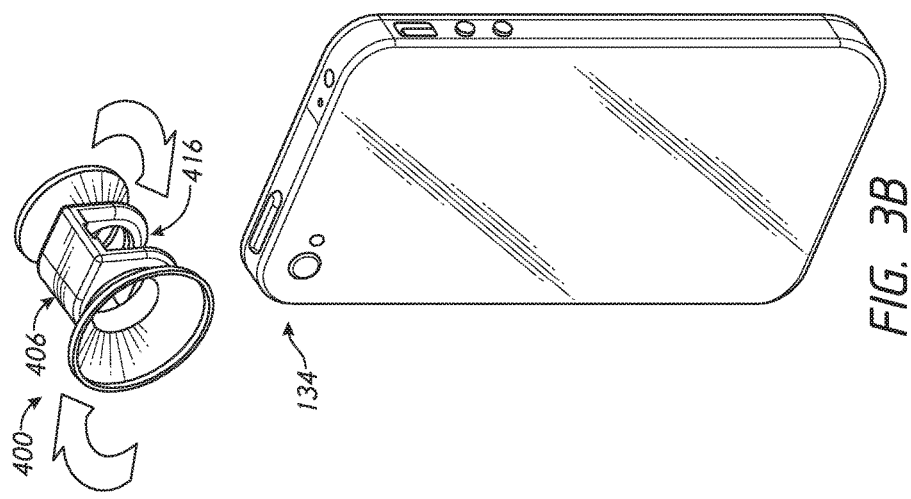
FIGS. 3A and 3B illustrate an example of the auxiliary lens system of FIGS. 1A-1E being removed from the attachment position as shown in FIG. 2B and rotated about a generally vertical axis so as to switch the positions of the front and rear lenses when the auxiliary lens system is reattached.
Figure 3A:
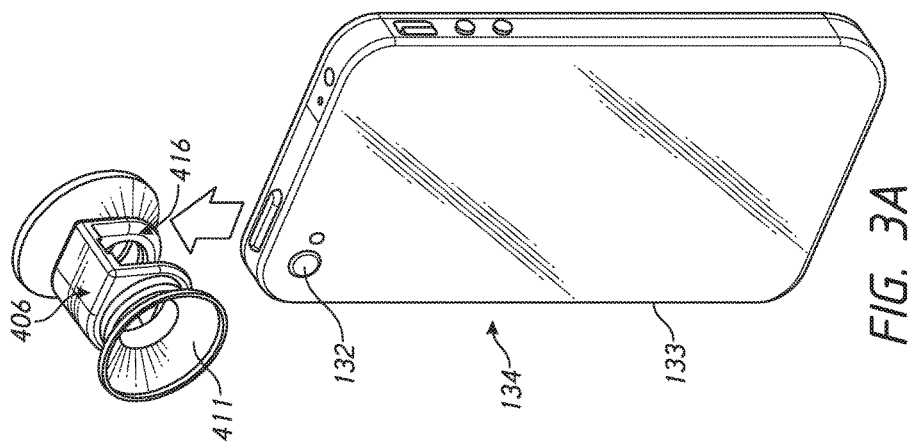

As illustrated in FIGS. 2A and 3B, the user can select which of the plurality of lenses 402, 404 to position in front of the camera 132 of the communication device 134 to achieve a desired photographic affect. In FIG. 2B, the lens component 400 is moved into an attachment position on a communication device 134 such that a first (e.g., smaller-diameter) lens 402 is positioned in front of the onboard camera lens 132 and a second (e.g., larger-diameter) lens 404 is positioned on an opposite side of the communication device 134. In this orientation, the smaller-diameter lens 402 is operative and the larger-diameter lens 404 is not operative. In FIGS. 3A-3B, the lens component 400 is removed from the communication device, rotated about a vertical axis (e.g., approximately 180° in this example), and rotated about a horizontal axis to orient the channel 416 in general alignment with an attachment surface (e.g., a housing edge) of the communication device. The auxiliary optical device 400 can again be advanced onto the communication device 134 such that the second optical component (e.g., the larger-diameter lens 404) is positioned in front of the onboard camera lens 132 and the first optical component (e.g., the smaller-diameter lens 402) is positioned on an opposite side of the communication device 134. In this orientation, the larger-diameter lens 404 is operative and the smaller-diameter lens 402 is not operative. In some embodiments, this configuration of a lens component 400 can conveniently permit multiple lens options without necessarily requiring the user to hold or store multiple discreet lens components. In some embodiments, more than two lens types or features can be included in the lens component 400, thereby providing the user with many lens options.

In the illustrated examples, though not in every embodiment, the first and second optical components 402, 404 are not in optical communication with each other, and only one of the optical components 402, 404 is in optical communication with a particular onboard camera 132 at the same time. The particular optical component 402 or 404 that is in optical communication with the onboard camera 132 is configured to receive light that is impinging upon the surface of the mobile electronic device in which the onboard camera 132 that in optical communication with the optical component 402 or 404 is located.

Any of the foregoing features, steps, structures, methods, or components, and/or anything else disclosed and/or illustrated in the '544 patent, can be used with or instead of any features, steps, structures, methods, or components disclosed and/or illustrated elsewhere in this specification. For example, any retainer portion disclosed below in this specification can be configured to attach to any optical component or lens described and/or illustrated above, and/or any feature of any retainer portion disclosed below in this specification can be combined with any retainer portion 400 (or any feature thereof) that is described and/or illustrated above, and/or any method of attaching a retainer portion to a mobile electronic communication device (or any step thereof) described and/or illustrated above can be used in any of the embodiments described and/or illustrated below, etc. Any other combinations of features can be used.

As illustrated in FIG. 4A, a mobile electronic device 134 can comprise, on a front side or face, a user-viewable touch-input screen 501, one or more user inputs 503, a speaker 505, and/or a first or front onboard camera 507. As shown in FIG. 4B, the mobile electronic device 134 can be coupled to and/or positioned within a protective case 509. As illustrated in FIG. 5A, the mobile electronic device 134 can comprise, on a rear side or face, a second or rear onboard camera 511, a microphone 513, and/or a flash or other illumination device 515. The rear side or face may be substantially planar and substantially parallel to the substantially planar front side or face.

The protective case 509 can provide an increased level of durability or protection for the mobile electronic device 134 against damage as compared to the durability and protection of the mobile electronic device 134 without a protective case. In some embodiments, the protective case 509 can comprise multiple components with different purposes. For example, a first component of the protective case 509 can be generally or substantially rigid or stiff to provide structural strength to protect against dropping against the ground or other blunt force exerted against the mobile electronic device 134, and a second component of the protective case 509 can be generally flexible, resilient, compressive, or stretchy to provide a force-absorbing or force-spreading capability.

In some embodiments, when the first and second components are used together, a protective case 509 can provide a high level of protection against most common causes of damage to a mobile electronic device 134. In some embodiments, the first component can be positioned in a close or adjacent relationship with the mobile electronic device 134, generally surrounding one or more or all regions of the mobile electronic device 134, and the second component can be positioned in a close or adjacent relationship with the first component and/or the mobile electronic device 134, generally surrounding one or more or all regions of the first component and/or the mobile electronic device 134. In some embodiments, the first component can be made of a rigid polymer such as a plastic such as polycarbonate, and the second component can be made of a cross-linked polymer such as silicone.

As illustrated, some embodiments of the protective case 509 can include a raised region or band 517 that is configured to extend around a periphery of the mobile electronic device 134 when the protective case 509 is removably attached to the mobile electronic device 134, such as around one or more (or all) of the top edge, lateral edges, and/or bottom edge of the protective case 509 and/or of the mobile electronic device 134. The raised region or band 517 can be configured to extend further in the outward direction from either or both of the front and rear surfaces of the mobile electronic device 134 and/or from either or both of the front surface and rear surface 519 of the protective case 509. The raised region or band 517 can provide a higher level of shock protection along the edges and/or corners of the protective case 509 than in one or more other regions of the protective case 509. In some embodiments, the protective case 509 can provide protection for the mobile electronic device 134 against ingress of one or more damaging or performance-inhibiting substances, such as liquid (water), dust, debris, or other undesirable substances.

The rear surface 519 of the protective case 509 can include a communication opening 521 or a transparent portion that is configured to permit light and/or sound to pass into and/or out from the mobile electronic device 134. The communication opening 521 has a width and a height that generally corresponds to the width and height of the second or rear onboard camera 511 or the width and height of the microphone 513 or the width and height of the flash or other illumination source 515. The thickness or depth of the communication opening 521 is generally the same as the thickness or depth of the rear surface 519 of the protective case 509 in the region adjacent to or near the communication opening 521.

As illustrated in FIGS. 6A and 6B, an auxiliary optical system 600 can be removably attached to the mobile electronic device 134 and protective case 509 such that one or more optical regions, such as lenses 603a or 603b, can be positioned in optical communication with one or more onboard cameras 507, 511 on the mobile electronic device 134. The auxiliary optical system 600 can include a support or a housing 601. As with all embodiments in this specification, the auxiliary optical system 600 can include any feature, structure, step, material, or component that is illustrated and/or described in any embodiment of any auxiliary optical device or system in this specification.

Although FIGS. 6A and 6B illustrate an auxiliary optical system 600 that attaches or contacts both a front and rear surface of a mobile electronic device 134 and/or protective case 509, an auxiliary optical system 600 can be provided with a retainer than attaches in any other suitable way, such as an attachment to the top edge of the protective case 509 and a single front or rear surface of the protective case 509 and/or the mobile electronic device 134.

Figure 7A:
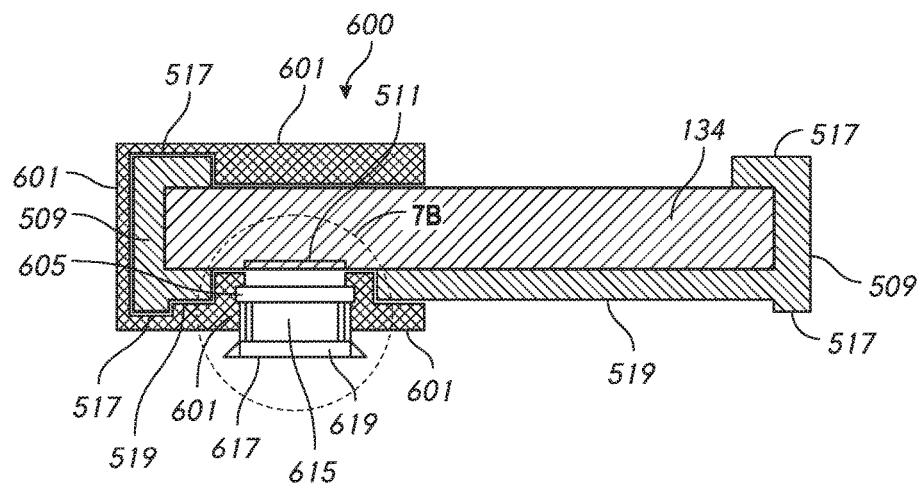
FIG. 7A is a horizontal cross-section of the combination of the mobile electronic device, protective case, and auxiliary optical system, along the line 7-7 of FIG. 6B, with a magnified region to help illustrated components in a small region.
Figure 7B:
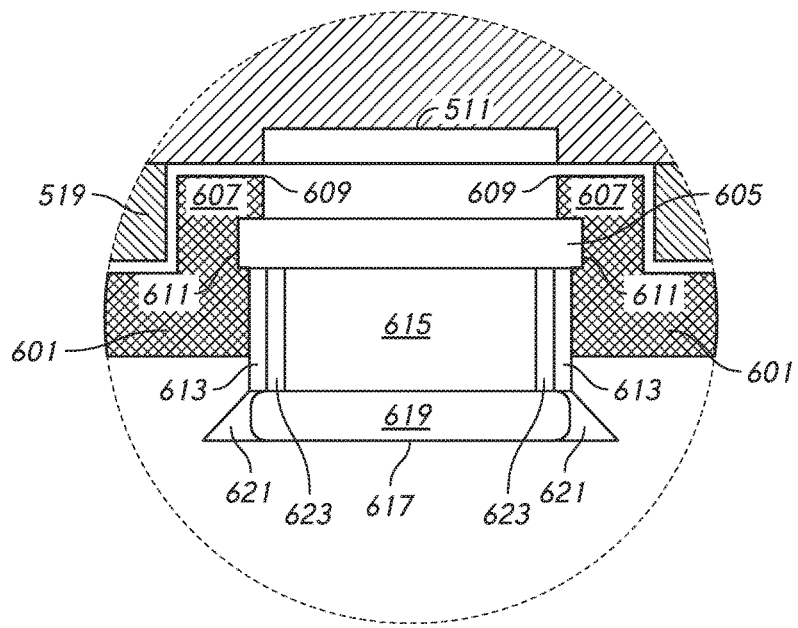
FIG. 7B is a magnified view of the 7B region of FIG. 7A to help illustrate components in the region.

FIGS. 7A and 7B provide an example of an arrangement of optical regions or lenses in an auxiliary optical system 600 that is configured to be removably attachable to a protective case 509. For example, the embodiment of FIGS. 7A and 7B permits an interior optical region or lens to be positioned within an optical channel 615 in a very close or adjacent or contacting relationship with a lens on an onboard camera 511 of a mobile electronic device 134, despite the fact that the auxiliary optical system 600 is attached to the mobile electronic device 134 on the outside of the protective case 509.

As shown in FIG. 7B, when the auxiliary optical system 600 is removably coupled to the protective case 509 and/or the mobile electronic device 134, an attachment portion, such as an interiorly protruding portion 607 of the support or housing 601 of the auxiliary optical system 600, can be configured to extend within the communication opening 521 of the protective case 509, such that the most inwardly protruding point 609 of the interiorly protruding portion 607 is within the interior of the communication opening 521 and inwardly below the rear surface 519 of the protective case 509 that is generally surrounding the communication opening 521.

The interiorly protruding portion 607 of the support or housing 601 of the auxiliary optical system 600 can support or retain or contain an inward lens 605 in a manner that positions the inward lens 605 sufficiently close to an onboard camera 507, 511 of the mobile electronic device 509 (when attached) to provide any desired optical capability or feature, such as a magnification by way of a "macro lens." In some embodiments, the distance between the onboard lens 511 of the mobile electronic device 509 and the inward lens 605 is less than or equal to about 2 mm or less than or equal to about 1 mm or less than or equal to about 0.5 mm.

As shown in FIG. 7B, a channel or seat 611 can be provided in a portion of the optical channel 615 that is within the interiorly protruding portion 607. The channel or seat 611 can be configured or adapted to receive the inward lens 605, without requiring any additional radially outward or circumferential seating or encasing member to receive the inward lens 605. A bushing 613 can be positioned within the optical channel 615 of the support or housing 601 that is configured to receive an outward or second lens assembly 617. In some embodiments, the bushing 613 is made of a metal such as aluminum and/or can include a retaining surface on the radially inward wall of the bushing 613 that includes a retaining structure such as screw threads and/or can include a retaining surface on the radially outward wall of the bushing 613 configured to interface with the interior of the optical channel 615, such as a radially outwardly protruding band or other protrusion or series of protrusions. The interior of the optical channel 615 can include a corresponding radially inward retaining surface, such as a recess or series of recesses configured to receive the radially outwardly protruding band or other protrusion or series of protrusions. The retaining surfaces of the bushing 613 and the wall of the optical channel 615 can be provided in any other suitable form, such as one or more protrusions on the wall of the optical channel 615 and one or more recesses on the exterior surface of the bushing 613. The bushing 613 can help to secure the inward lens 605 within the optical channel 615, such as with a press fit or friction fit.

The outward or second lens assembly 617 can comprise an outward lens 619 and a lens casing 621 that generally surrounds the outward lens 619, and an attachment region, such as an attachment base or shaft 623. A selective attachment region, such as a threaded region, can be provided on the attachment base or shaft 623, such as on a radially outward surface of the attachment shaft 623, to help affix the inner surface of the bushing 613 to the outer surface of the attachment shaft 623. At least a portion of the outward or second lens assembly 617 can extend outside of the optical channel 615 and/or outside of the support or housing 601.

Figure 8A:
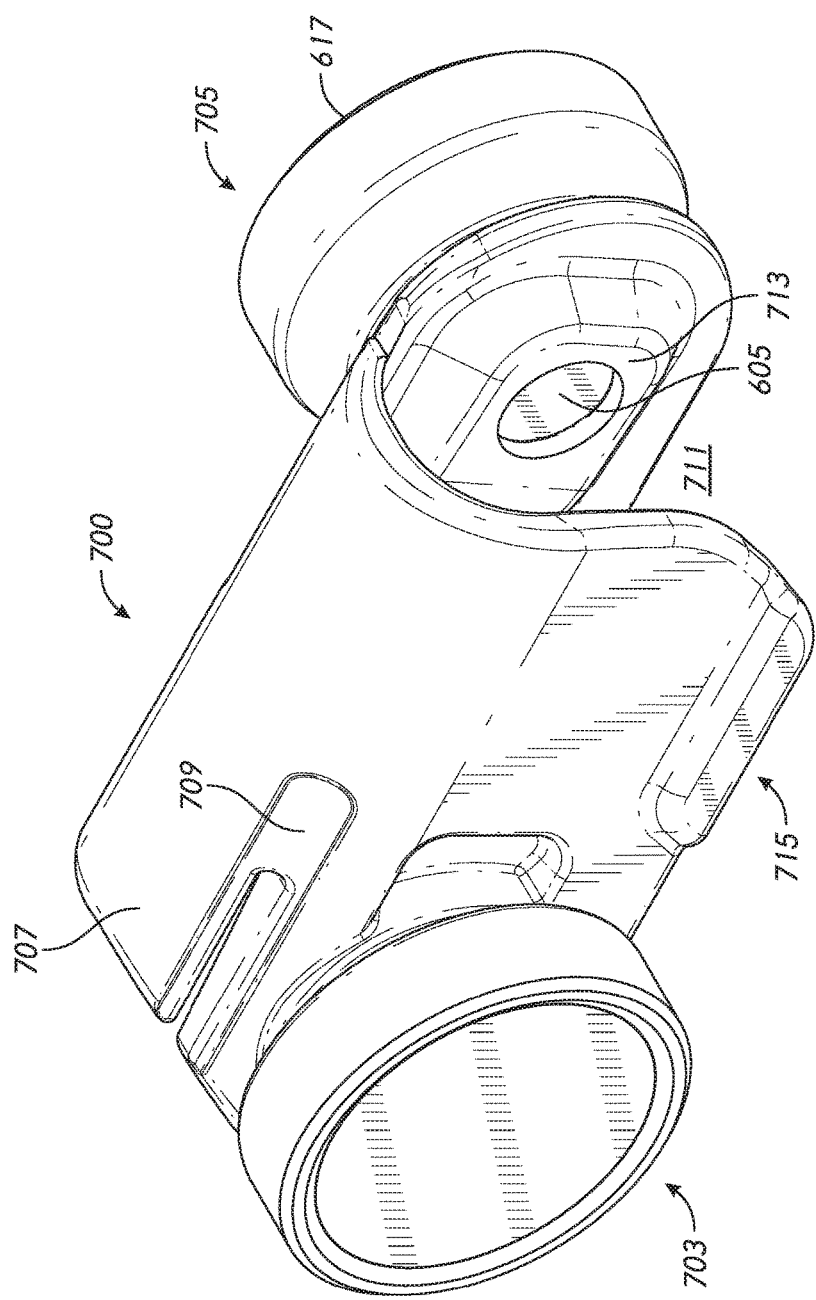
FIGS. 8A and 8B provide various view of an example of an auxiliary optical system that is configured to be removably coupled with a mobile electronic device that is located within and/or attached to a protective case.
Figure 8B:
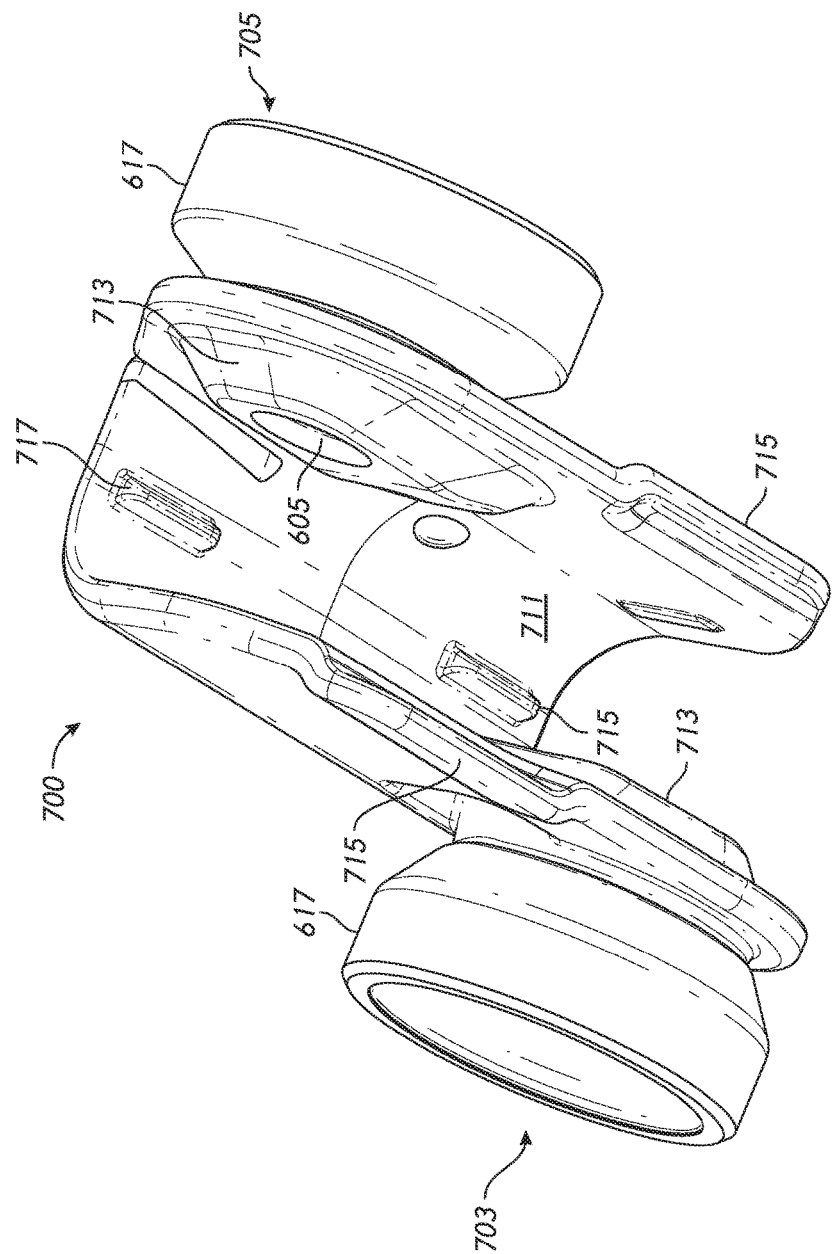

FIGS. 8A and 8B illustrate another embodiment of an auxiliary optical system 700. As with all embodiments in this specification, any feature, structure, step, material, or component that is illustrated and/or described in any embodiment in this specification can be used with or instead of any feature, structure, step, material, or component of auxiliary optical system 700. For example, all of the features, structures, steps, materials, or components, either individually or collectively, of the auxiliary optical system 600 of FIGS. 6A, 6B, 7A, and 7B can be used with or instead of those of auxiliary optical system 700.

The auxiliary optical system 700 can include one or at least two optical zones or lens assemblies 703, 705 and a housing, support, or retainer 707 that is configured to attach the auxiliary optical system 700 to a mobile electronic device 134. The housing, support, or retainer 707 may include multiple sidewalls (e.g., a first and second sidewall) with an interior 711 (e.g., a channel or grove) between the two sidewalls. The one or more lens assemblies 703, 705 can be attached to, supported by, or partially or fully contained within, the housing, support, or retainer 707. One or more expanding zones 709 can be provided to help the retainer 707 to temporarily expand during attachment to the protective case 509 and/or to the mobile electronic device 134. For example, an expanding zone 709 may be located at a corner, connection point, or transition between a sidewall of the retainer 700 and an upper wall that extends between two sidewalls. In some embodiments, as shown, the one or more expanding zones 709 can be configured to permit an interior 711 of the retainer 707 to temporarily become sufficiently wide to pass over the raised region or band 517 of the protective case 509 as the retainer 707 is pushed onto the protective case 509 and/or mobile electronic device 134. In some embodiments, the expanding zones may be sufficiently resilient to cause the interior 711 of the retainer to return to a substantially unexpanded state. In the sufficiently unexpanded state, the retainer 707 may be secured to the protective case.

The auxiliary optical system 700 can include one or more attachment portions, such as interior protrusions 713, that are configured to be positioned within a communication opening 521 on a protective case 509. The interior protrusions 713 or other attachment portions may extend from a sidewall of the retainer 700 into an interior 711 and towards a second sidewall of the retainer 700. In some embodiments, as shown, one or more of the interior protrusions 713 or other attachment portions can be sized and shaped to register with or contact or match one or more or all sidewalls of the communication opening 521 of the protective case 509. The interior protrusion 713 can include one or more or all of the features, structures, and components of the inwardly protruding portion 607 of FIG. 7B, including the inward lens 605.

The auxiliary optical system 700 can include one or more outward or second lens assemblies 617 in the form of optical zones or lens assemblies 703, 705, with any or all of the features, structures, or components of the outward or second lens assemblies 617 as illustrated and/or described in connection with FIGS. 7A and 7B. In some embodiments, as shown, the auxiliary optical system 700 can include at least two outward or second lens assemblies 617.

As illustrated, in some embodiments, the auxiliary optical system 700 can include a release region 715 to facilitate removal of the auxiliary optical system 700 from the protective case 509 after use. For example, the release region 715 can be provided in the form of an outwardly flared region or a ledge or a shoulder against which a user can push with a thumb or finger to more easily apply a force to remove the auxiliary optical system 700 from the protective case 509. When a protective case 509 includes a flexible or resilient or compressive component, the coefficient of friction against the retainer 707 can be particularly high, which makes the release region 715 particularly useful. As shown, the release region 715 can be provided along a bottom edge of the retainer 707, or in any other useful location.

In some embodiments, as shown, one or a plurality of engagement structures, such as protrusions 717, can be provided to improve the accuracy, security, and/or resistance to movement of the attachment between the retainer 707 of the auxiliary optical system 700 and the protective case 509. For example, in some embodiments, one or more protrusions 717 can extend into the interior 711 of the retainer 707 such that when the retainer is moved into engagement with the protective case 509, such as along an upper edge of the protective case 509, the one or more protrusions 717 are configured to be received into a corresponding groove or recess or hole in the protective case 509.

Figure 9:
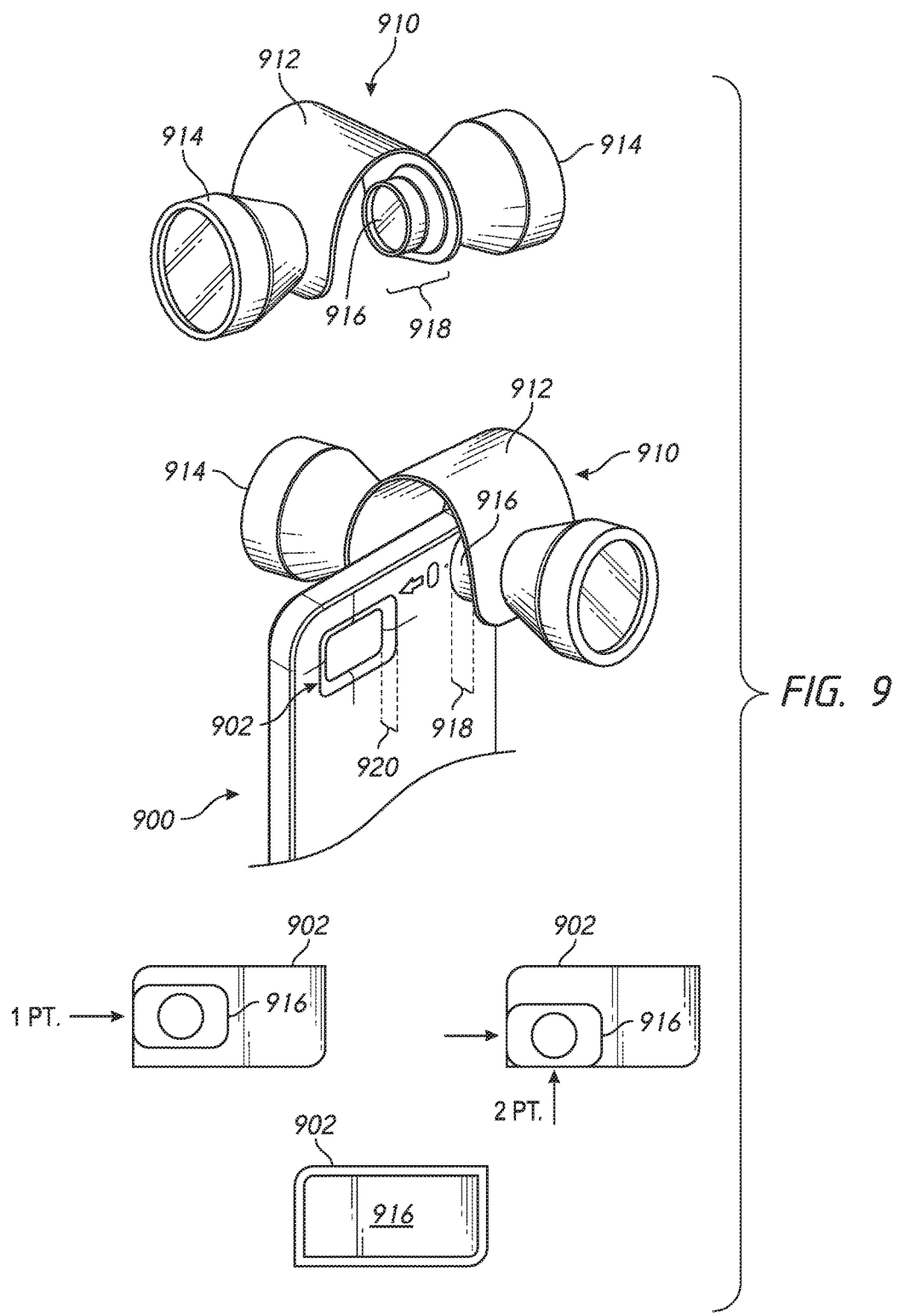
FIG. 9 illustrates various views of another example auxiliary lens system with multiple lenses that can be used with a mobile electronic device in a protective case.

FIG. 9 illustrates another embodiment of a protective case 900 and an auxiliary lens system 910 for a mobile electronic device. As with all embodiments in this specification, any feature, structure, step, material, or component that is illustrated and/or described in any embodiment in this specification can be used with or instead of any feature, structure, step, material, or component of protective case 900 or auxiliary optical system 910. For example, all of the features, structures, steps, materials, or components, either individually or collectively, of the auxiliary optical system 600 or 700 shown in FIG. 6A, 6B, 7A, 7B, 8A, or 8B can be used with or instead of those of auxiliary optical system 910. As another example, all of the features, structures, steps, materials, or components, either individually or collectively, of the protective case 509 shown in FIGS. 4B, 5B, 6A, and 6B can be used with or instead of those of protective case 900.

In example shown in FIG. 9, the protective case 900 is configured with a component access region 902 that can include any structure, material, function, method, or step that is illustrated or described in connection with any embodiment of any other of the component access regions described in this specification. When the case 900 is installed on or otherwise attached to a mobile device, the component access region 902 can be aligned with and provide access to an onboard camera 102 of the mobile device. For example, an auxiliary lens system 910 may be attached to the case 900 and communicate optically with the onboard camera 102 via the component access region 902.

In some embodiments, as shown, the auxiliary lens system 910 may include a retainer portion 912, such as a clip or some other structure that secures the auxiliary lens system 910 to the case 900. One or more optical elements, such as lenses 914, may be coupled to the retainer portion 912. Examples of other retainer portions and optical elements coupled thereto are described elsewhere in the present disclosure, and in the '544 patent and the '594 application. Any structure, material, function, method, or step that is illustrated or described in connection with any retainer portions or optical elements in these appendices can be used instead of or in addition to any structure, material, function, method, or step that is illustrated or described in this specification.

The auxiliary lens system 910 may include an optical positioning structure 916. The optical positioning structure 916 may protrude from an interior face of a sidewall of the retainer portion 912 and towards an onboard camera 102 of a mobile device when the auxiliary lens system 910 is installed on a case 900. The protruding nature of the optical positioning structure can aid in ensuring that a proper distance is achieved and maintained between a lens 914 and the onboard camera 102. For example, although a substantial portion of a lens 914 may extend outward from an exterior face of a sidewall of the retainer portion 912, at least a portion of the lens 914 may extend through an aperture in the sidewall of the retainer portion 912 and into the optical positioning structure 916. When the optical positioning structure 916 is placed in close proximity to the onboard camera 102 of the mobile device, the lens 914 is also positioned in close proximity to the onboard camera 102. In some embodiments, a distance 918 that the optical positioning structure 916 protrudes from an interior face of a sidewall of the retainer portion 912 may correspond to a thickness 920 of the case 900 at the component access region 902. While such a thickness 920 helps prevent objects from getting close to or contacting the onboard camera 102, the corresponding protrusion distance 918 of the optical positioning structure 916 allows a lens 914 to be reliably positioned within the component access region 902 at a desired distance from the onboard camera 102, even when the desired distance is less than the thickness 920 of the case in the area surrounding the onboard camera 102.

In some embodiments (not illustrated), the optical positioning structure 916 and the component access region 902 can have any type of corresponding or complementary shapes to permit a secure attachment that resists movement when attached. For example, in some embodiments, the optical positioning structure 916 can be a recess or can comprise a recess (such as a recess in the retainer portion 912), and the component access region 902 can comprise a corresponding or complementary protrusion (such as a raised rim or other structure surrounding or generally surrounding the periphery of the component access region 902) that can fit within or otherwise couple with or attach to the recess of the optical positioning structure 916. In some embodiments, the optical positioning structure 916 and the component access region 902 can each comprise one or a plurality of protrusions and/or recesses that are configured to removably mate or couple or attach to each other. In some embodiments, the corresponding or complementary shapes of the optical positioning structure 916 and the component access region 902 can be keyed to each other.

In some embodiments, the optical positioning structure 916 can help align an optical axis of a lens 914 with an optical axis of an onboard camera 102 in a secure manner that resists sliding or turning or otherwise moving. For example, as shown in FIG. 9, the optical positioning structure 916 can contact an edge of the component access region 902 of the case 900 at one or more points or regions. Contacting an edge of the component access region 902 (whether protruding or recessed or both) can restrict or resist lateral and/or longitudinal movement of the lens 914 (e.g., side-to-side, up-and-down) or the auxiliary lens system 910 as a whole, thereby helping to maintain a desired alignment of the lens 914 with respect to the onboard camera 102. As shown, the optical alignment structure 916 may be shaped, sized, or otherwise configured to contact an edge of the component access region 902 at one point, multiple points, or continuously along a portion or the entire edge surface of the component access region 902, such that the periphery of the optical alignment structure 916 generally matches the periphery of the component access region 902.

Figure 10:
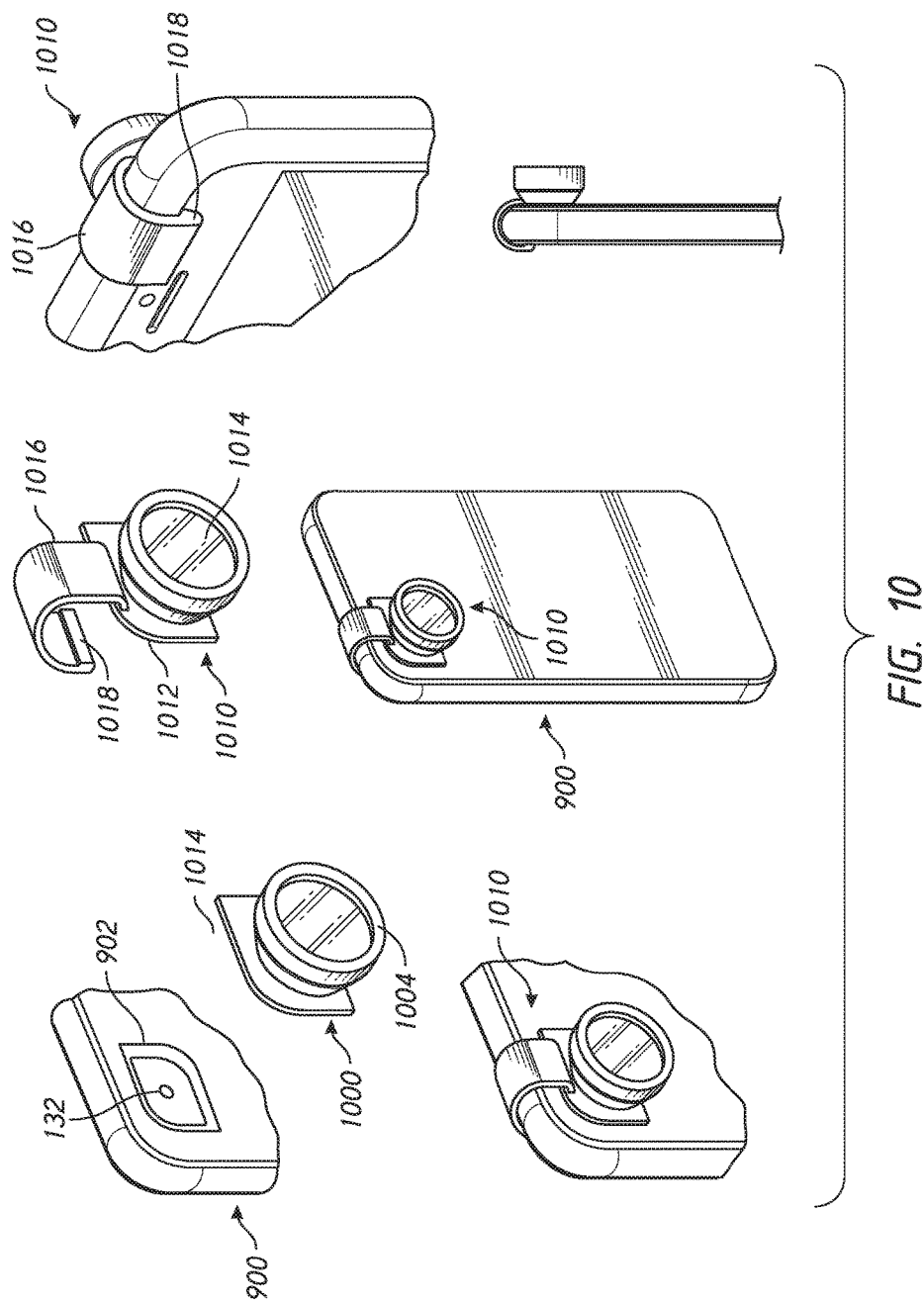
FIG. 10 illustrates various views of another example auxiliary lens system that can be used with a mobile electronic device in a protective case.

FIG. 10 shows another example of an auxiliary lens system 1000 configured to be removably attachable by a user to a case 900. As with all embodiments in this specification, any feature, structure, step, material, or component that is illustrated and/or described in any embodiment in this specification can be used with or instead of any feature, structure, step, material, or component of auxiliary lens system 1000. For example, all of the features, structures, steps, materials, or components, either individually or collectively, of the auxiliary optical systems 600, 700, or 900 shown in FIGS. 6A, 6B, 7A, 7B, 8A, 8B, and 9 can be used with or instead of those of auxiliary optical system 1000.

The auxiliary lens system 1000 shown in FIG. 10 may include an attachment portion 1002 and an optical element, such as a lens 1004. In some embodiments, as shown, the attachment portion 1002 may be sized and/or shaped to be complementary to or to match a size and/or shape of the component access region 902 of the case 900. In some embodiments, the component access region 902 may be an opening, aperture, or void in an outward facing plane of the case 900. The component access region 902 may comprise a plurality of sides, each side having a top edge in the outward facing plane of the case 900 and an internal edge interior to, or recessed below, the outward facing plane of the case and comprising the sidewall or sidewalls of the opening, aperture, or void into the case 900. The attachment portion 1002 may be inserted entirely or at least partially into or within the component access region 902 and contact all or substantially all of the internal edge of the component access region 902. For example, the attachment portion 1002 may be secured to the component access region 902 by an interference fit, friction fit, snap fit, or otherwise interfacing with the component access region 902. By contacting all or substantially all of the inner edge of the component access region 902, the attachment portion 1002 may ensure proper alignment of the lens 1004 with an onboard camera of the mobile device onto which the case 900 is installed. The attachment portion 1002 may also act as an optical alignment structure as described above.

In some embodiments, as shown, an auxiliary lens system 1010 may include a retainer portion 1016 in addition to an attachment portion 1012 and an optical element, such as a lens 1014. As shown, the retainer portion 1016 may be an arm that initially extends from the attachment portion 1012 in a lateral or longitudinal direction with respect to the attachment portion 1012 and case 900, rather than away from a front or rear face of the attachment portion 1012. The retainer portion 1016 may be configured to hook onto or over one or more edges of the case 900 to aid the attachment portion 1002 in securing the auxiliary lens system 1010 to the case 900. For example, a mobile device 100 may have two substantially parallel, substantially planar faces: a "front" face seen by user during normal use (typically including a display screen that the user accesses and views), and a "rear" face that faces away from the user during normal use. An onboard camera 102 may be positioned on the rear face of the mobile device 100. The component access region 902 of the case 900 may be aligned with the onboard camera 102 on the rear face when the case 900 is installed on the mobile device 100. The retainer portion 1016 may include connection structure 1018, such as a tab, that contacts a portion of the case 900 on a side or face of the mobile device 100 (e.g., the "front" face) opposite the side or face (e.g., the "rear face") of the mobile device 100 with which the component access region 902 is aligned. The connection structure 1018 may snap onto or provide a friction fit with the edge of the case 900.

In some embodiments, as illustrated, the auxiliary lens system 1000 can register with or be removably secured to a case 900 by way of multiple contacts (e.g., at least two or three or more contacts) in different planes and/or in different regions of the case 900, such as any or all of the following: (a) one or more contacts between the attachment portion 1002 and the component access region 902 on a first face (e.g., a front face) of the case 900; (b) one or more contacts between the retainer portion 1016 and an edge (e.g., top or side) of the case 900; and/or (c) one or more contacts between the retainer portion 1016 and a second face (e.g., a rear face) of the case 900, etc.

Figure 11:
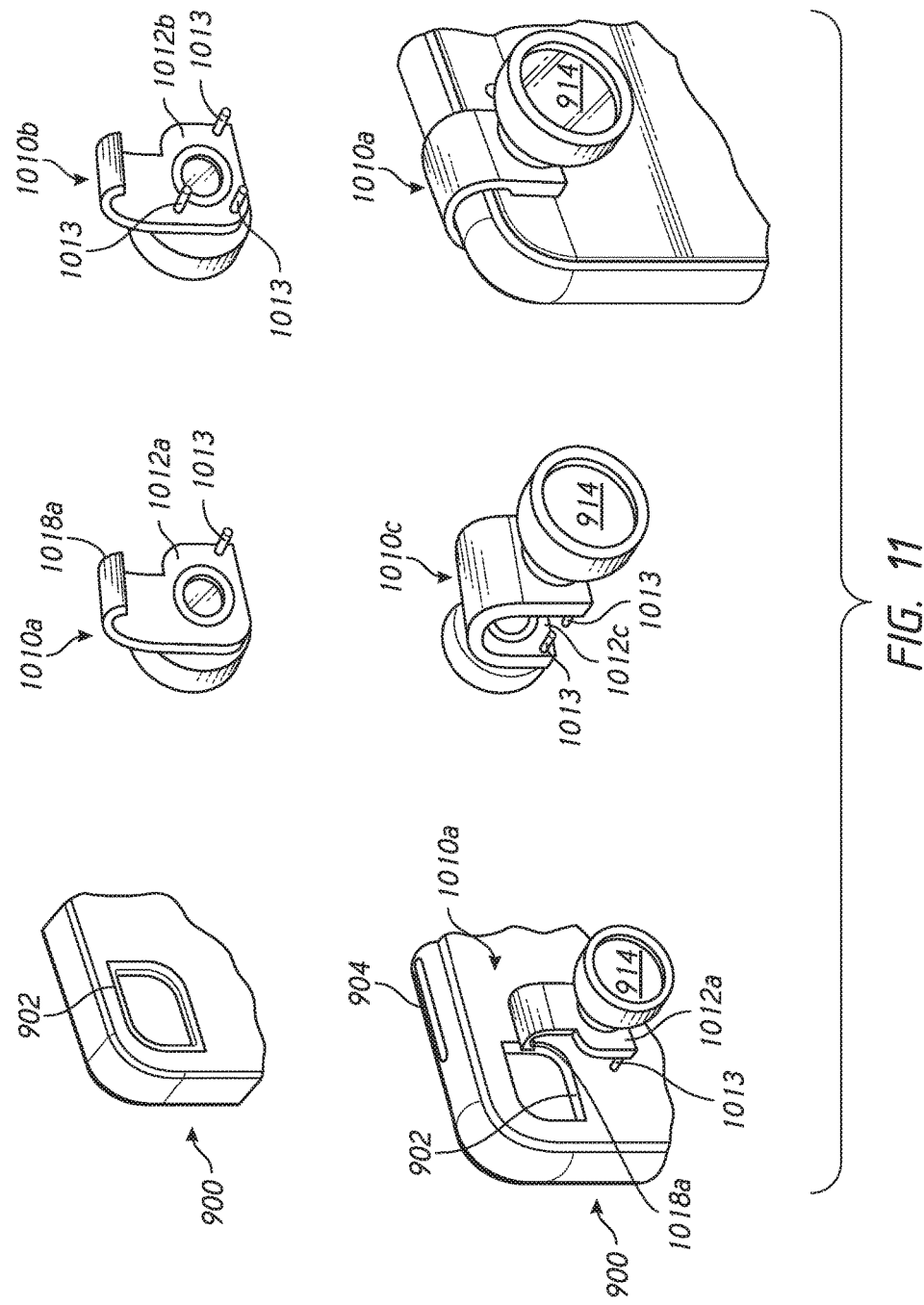
FIG. 11 illustrates various views of an example auxiliary lens system with locating structures that can be used with a mobile electronic device in a protective case.

FIG. 11 illustrates additional examples of auxiliary lens systems 1010a, 1010b, and 1010c that can be used with a mobile electronic device in a protective case 900. As with all embodiments in this specification, any feature, structure, step, material, or component that is illustrated and/or described in any embodiment in this specification can be used with or instead of any feature, structure, step, material, or component of auxiliary lens systems 1010a, 1010b, and 1010c. For example, all of the features, structures, steps, materials, or components, either individually or collectively, of the auxiliary optical systems 600, 700, 900, or 1000 shown in FIGS. 6A, 6B, 7A, 7B, 8A, 8B, 9 and 10 can be used with or instead of those of auxiliary optical systems 1010a, 1010b, and 1010c.

As illustrated in FIG. 11, in some embodiments, an auxiliary lens system 1010a, 1010b, or 1010c can comprise a respective attachment portion 1012a, 1012b, or 1012c with one or a plurality of respective locating structures 1013 that can assist in positioning and securing the respective attachment portion 1012a, 1012b, 1012c to the component access region 902 of the case 900, In some embodiments, one of more of the locating structures 1013 are configured to extend into and contact one or more edges of the component access region 902 of the case 900. In some embodiments, as shown, the auxiliary lens system 1010c can comprise a plurality of lenses 914. In some embodiments, as illustrated in FIG. 11, the locating structures 1013 can comprise protrusions such as elongate pegs. In some embodiments, the locating structures 1013 can be recesses, or a combination or protrusions and recesses. As shown, the overall shape or periphery of the respective attachment portion 1010a, 1010b, 1010c need not conform with the overall shape or periphery of the component access region 902; rather, one or more points or regions of contact can be utilized to secure the respective attachment portion 1010a, 1010b, 1010c to a point or region of the component access region 902, such as in one or more corners of the component access region 902.

In some embodiments, a case 900 may have an alignment portion 904 on an edge or face of the case 900, such as a groove, channel, ridge, rail, recess, or protrusion. Accessories may use the alignment portion 904 to aid in alignment with a component access region 902 or with some other component or region of the case 900 and/or mobile device 100. For example, as shown in FIG. 11, the alignment portion 904 may be a groove located on an edge of the case 900 near a component access region 902. An auxiliary lens system 1010a may include a connection structure 1018a configured to interface with the alignment portion 904 (e.g., the connection structure 1018a may be sized and/or shaped to be complementary to a size and/or shape of the alignment portion 904). When the auxiliary lens system 1010a is attached to the case 900, the connection structure 1018a can be inserted into or otherwise contact the alignment portion 904 and aid in ensuring proper alignment of a lens 914 of the auxiliary lens system 1010a with an onboard camera of the mobile device 100. For example, the alignment portion 904 may inhibit or prevent lateral movement of the connection structure 1018a that would otherwise cause a misalignment of the optical axes of the lens 914 and onboard camera 102. In some embodiments, the auxiliary lens system 1010a may be attached to the case 900 via the alignment portion 904 such that auxiliary lens system 1010a is securely coupled to the case due to a friction fit, interference fit, snap fit, or some other connection of the connection structure 1018a with the alignment portion 904 that resists inadvertent movement or detachment of the auxiliary lens system 1010a.

As with all embodiments in this specification, any structure, material, function, method, or step that is illustrated or described anywhere else in this specification can be used instead of or in addition to those illustrated or described in connection with FIG. 11. For example, any of the plurality of contacts described to register or secure the auxiliary lens system 1000 of FIG. 10 to the case 900 can be used to register or secure the respective auxiliary lens system 1010a, 1010b, 1010c to the case 900.

Figure 12:
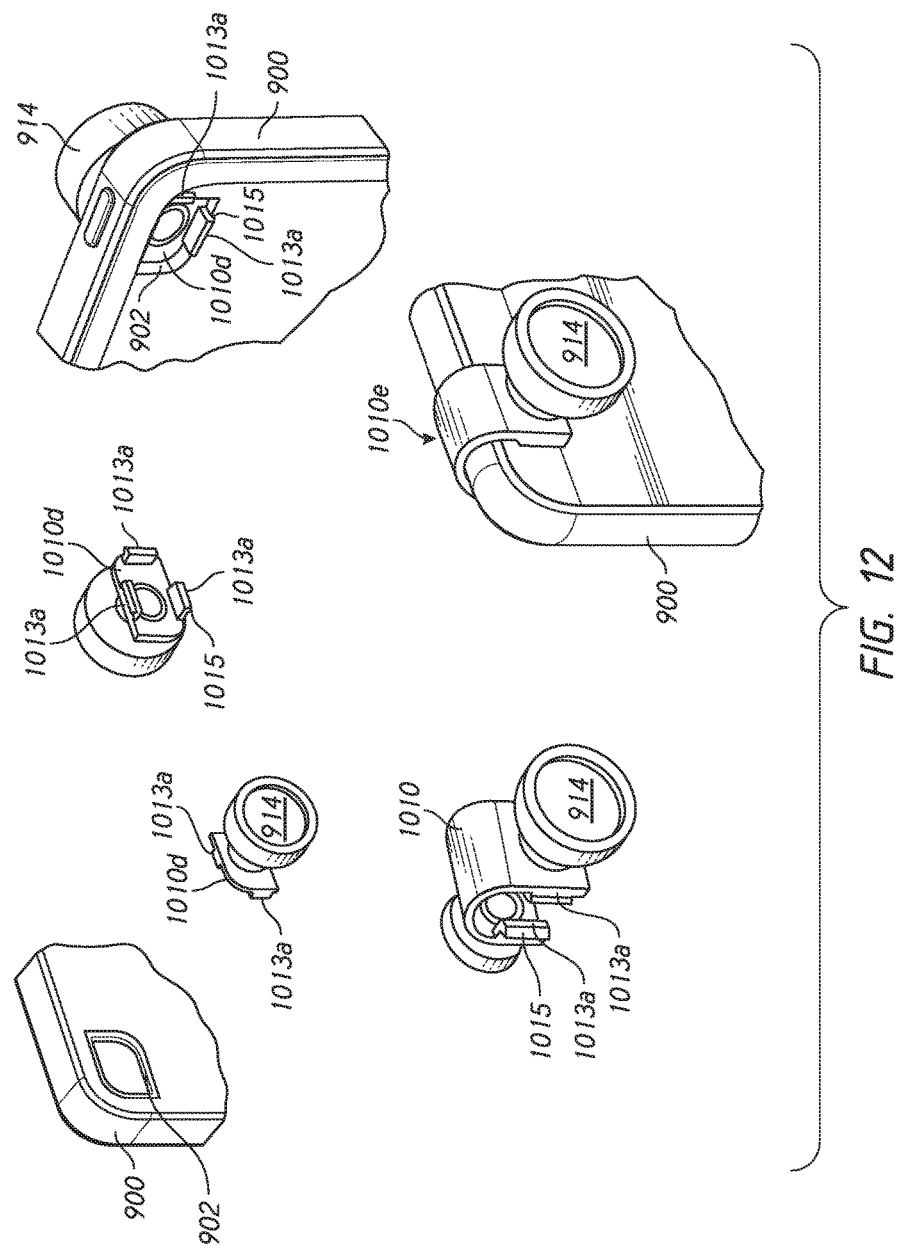
FIG. 12 illustrates various views of another example auxiliary lens system with locating structures that can be used with a mobile electronic device in a protective case.

FIG. 12 illustrates additional examples of auxiliary lens systems 1010d, 1010e. As shown, in some embodiments, the locating structures 1013a can be elongate in shape along an edge or along a side of the component access region 902. One or more of the locating structures 1013a can be shaped as tabs that are configured to extend into the component access region 902. The tabs can comprise one or more hooks or other securing structure that are configured to contact an interior face or side of the case 900 to help secure the tabs and the auxiliary lens systems to the case 900. In some embodiments, an auxiliary lens system, 1010e can comprise a plurality of lenses 914 with any of the structures or features or capabilities of any of the other lenses disclosed elsewhere in this specification. In some embodiments, as shown, a plurality of tabs can be positioned and/or oriented so as to be generally orthogonal or non-parallel with each other so as to help independently resist motion in one or more generally orthogonal or non-parallel directions. The structure, configuration, and/or orientation of the locating structures 1013a in FIG. 12 can be used with any embodiment in this specification, as with all other structures, materials, functions, methods, or steps that are illustrated or described in this specification.

Figure 13:
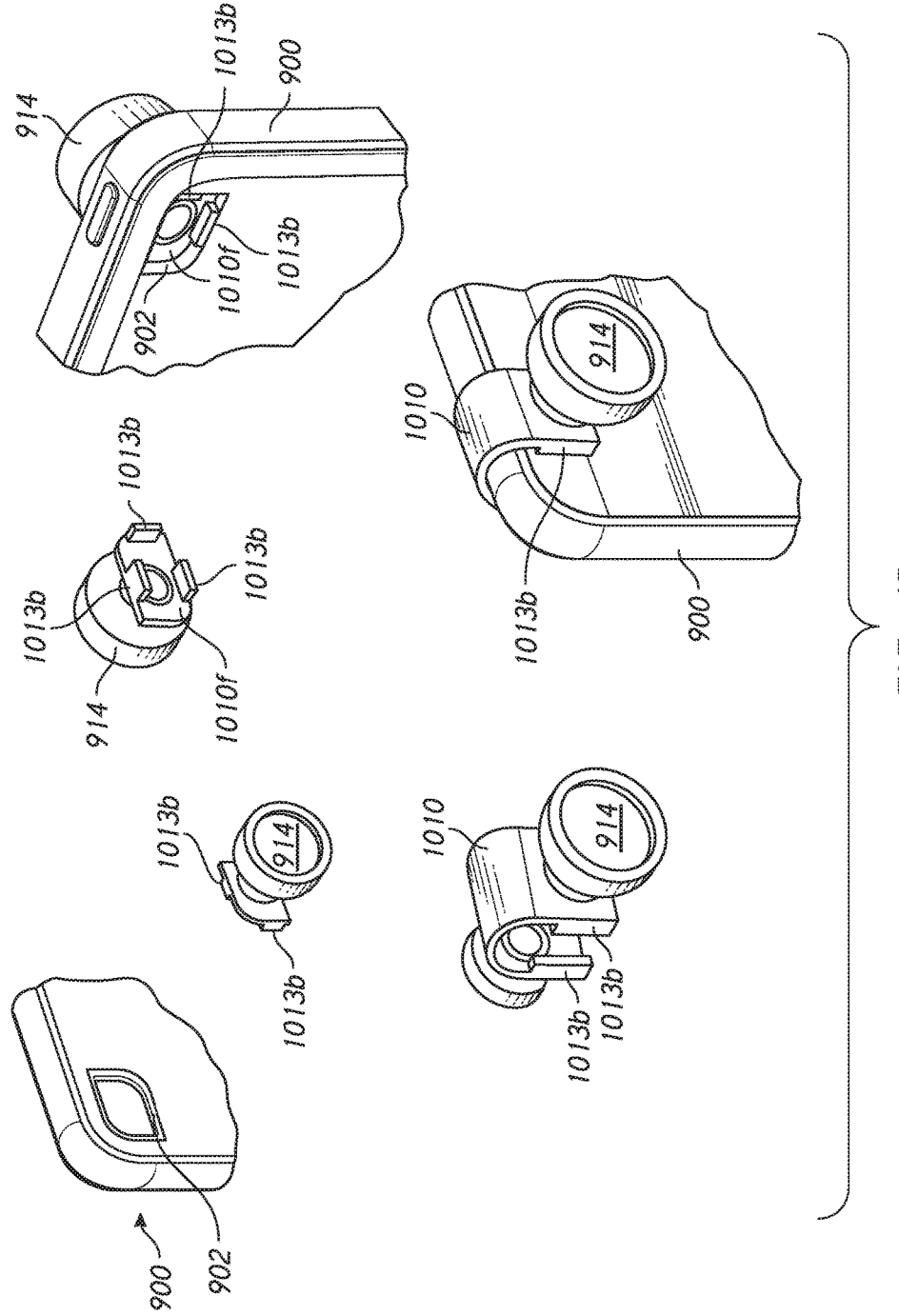
FIG. 13 illustrates various views of another example auxiliary lens system with locating structures that can be used with a mobile electronic device in a protective case.

FIG. 13 illustrates additional examples of auxiliary lens systems 1010f, 1010g that can include any or all of the structures of FIG. 12, as with all embodiments in this specification. As illustrated, the locating structures 1013b of the auxiliary lens systems 1010f, 1010g of FIG. 13 do not include hooks or other securing structure as with the locating structures 1013a of FIG. 12. In some embodiments, the locating structures 1013b can be configured to retain the auxiliary lens systems 1010f, 1010g by way of a friction fit between one or more edges or sides of one or more locating structures 1013b and one or more edges or sides of the component access region 902. In some embodiments, an auxiliary lens system can comprise one or more different types of locating structures in the same auxiliary lens system, such as one or more elongate, narrow locating structures 1013, one or more generally planar tabs 1013b, and/or one or more tabs 1013a with hooked or other securing portions. Any auxiliary lens system disclosed in this specification can be secured to or register on multiple points or regions of a case such as on those points or regions described in connection with FIG. 10.

As with all embodiments in this specification, any structure, material, function, method, or step that is illustrated or described anywhere else in this specification can be used instead of or in addition to those illustrated or described in connection with FIGS. 12 and/or 13.

All embodiments in this specification may be manufactured and/or assembled according to certain methods. For example, a method of manufacturing an auxiliary optical system may include providing at least one optical component and providing a retainer configured to removably attach to a protective case, wherein the at least one optical component is attached or attachable to the retainer, and wherein an interior protrusion of the retainer is configured to be positioned within an interior of an opening in the protective case when the retainer is attached to the protective case.

The following is claimed:

1. An auxiliary optical system comprising:
   a retainer configured to removably attach to a protective case for a mobile electronic device;
   a first optical component attached to the retainer; and
   a second optical component attached to the retainer, wherein the first optical component is attached to a first side of the retainer and the second optical component is attached to a second side of the retainer; wherein
   the retainer comprises at least one attachment portion that extends from an interior wall of the retainer, and wherein the attachment portion is configured to be positioned within an interior of an opening in the protective case when the retainer is attached to the protective case;
   the retainer is reversible between a first position and a second position relative to the protective case;
   in the first position, the first optical component is configured to optically communicate with a user-facing camera of the mobile electronic device to which the protective case is connected and the second optical component is configured to optically communicate with a rear-facing camera of the mobile electronic device; and in the second position, the first optical component is configured to optically communicate with the rear-facing camera of the mobile electronic device and the second optical component is configured to optically communicate with the user-facing camera of the mobile electronic device.

2. A combination of the auxiliary optical system of claim 1 and the protective case.

3. The auxiliary optical system of claim 1 wherein the first optical component is configured to provides a different optical feature than the second optical component.

4. The auxiliary optical system of claim 1, wherein the first optical component is configured to be positioned less than 1 mm from a lens of at least one of the user-facing camera or the rear-facing camera of the mobile electronic device.

5. The auxiliary optical system of claim 1, wherein the retainer comprises an expanding zone configured to permit an interior of the retainer to temporarily become sufficiently wide to pass over a portion of the protective case as the retainer is attached to the protective case.

6. The auxiliary optical system of claim 5, wherein the expanding zone is configured to cause the interior to of the retainer to return to a substantially unexpanded state.

7. The auxiliary optical system of claim 1, wherein the attachment portion is configured to be inserted within a component access region of the protective case.

8. The auxiliary optical system of claim 7, wherein the component access region comprises a plurality of sides, each side having a top edge in an outward facing plane of the case and an internal edge recessed below the outward facing plane of the case, wherein each side of the plurality of sides comprises a sidewall.

9. The auxiliary optical system of claim 8, wherein the attachment portion is configured to contact all or substantially all of an internal edge of the component access region.

10. The auxiliary optical system of claim 8, wherein the attachment portion is configured to contact all or substantially all of a plurality of internal edges of the component access region.

11. The auxiliary optical system of claim 8, wherein the attachment portion comprises one or more locating structures.

12. A method of manufacturing an auxiliary optical system, the method comprising:
   providing a first optical component;
   providing a second optical component and
   providing a retainer configured to removably attach to a protective case, wherein
   the first optical component is attached or attachable to a first side of the retainer and the second optical component is attached or attachable to a second side of the retainer,
   an interior protrusion of the retainer is configured to be positioned within an interior of an opening in the protective case when the retainer is attached to the protective case;
   the retainer is reversible between a first position and a second position;
   in the first position, the first optical component is configured to optically communicate with a user-facing camera of a mobile electronic device to which the protective case is attached and the second optical component is configured to optically communicate with a rear-facing camera of the mobile electronic device; and
   in the second position, the first optical component is configured to optically communicate with the rear-facing camera and the second optical component is configured to optically communicate with the user-facing camera.

13. The method of claim 12, further comprising providing the protective case.

14. The method of claim 12, wherein the first optical component is configured to provide a different optical feature than the second optical component.

15. The method of claim 12, wherein at least one of the first optical component or the second optical component is configured to be positioned less than 1 mm from a lens of the rear-facing camera or the user-facing camera of the mobile electronic device when the auxiliary optical system is attached to a protective case that contains the mobile electronic device.

16. The method of claim 12, wherein the retainer comprises an expanding zone configured to permit an interior of the retainer to temporarily become sufficiently wide to pass over a portion of the protective case as the retainer is advanced onto the protective case.

17. An auxiliary optical system for attachment to a protective case coupled to a mobile electronic device having a first camera facing in a first direction and a second camera facing in a second direction, the auxiliary optical system comprising:
   a retainer that removably couples to the protective case, the retainer comprising:
      an interior wall; and
      an attachment portion extending from the interior wall, wherein when the retainer is coupled to the protective case the attachment portion is received within an opening of the protective case to secure the retainer to the protective case;
   a first lens assembly connected to a first sidewall of the retainer; and
   a second lens assembly connected to a second sidewall of the retainer; wherein
   the retainer is positionable on the protective case in a first position and a second position;
   in the first position, the first lens assembly is in optical communication with the first camera of the mobile electronic device and the second lens assembly is in optical communication with the second camera of the mobile electronic device; and
   in the second position, the first lens assembly is in optical communication with the second camera of the mobile electronic device and the second lens assembly is in optical communication with the first camera of the mobile electronic device.

18. The auxiliary optical system of claim 17, wherein the retainer further comprises an expansion zone that flexes between an expanded position allowing the retainer to be inserted onto or removed from the protective case and an unexpanded position allowing the retainer to engage at least a portion of the protective case to secure the retainer to the protective case.

* * * * *